US010236684B2

(12) United States Patent
Wakita (10) Patent No.: US 10,236,684 B2
(45) Date of Patent: Mar. 19, 2019

(54) ESD PROTECTION CIRCUIT

(71) Applicant: KABUSHIKI KAISHA TOSHIBA, Tokyo (JP)

(72) Inventor: Naoki Wakita, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 15/446,989

(22) Filed: Mar. 1, 2017

(65) Prior Publication Data

US 2018/0115154 A1    Apr. 26, 2018

(30) Foreign Application Priority Data

Oct. 24, 2016 (JP) .................................. 2016-207842

(51) Int. Cl.
*H02H 9/04* (2006.01)

(52) U.S. Cl.
CPC .............. *H02H 9/04* (2013.01); *H02H 9/041* (2013.01); *H02H 9/046* (2013.01)

(58) Field of Classification Search
CPC ........... H02H 9/04; H02H 9/041; H02H 9/046
USPC .......................................................... 361/56
See application file for complete search history.

(56) References Cited

U.S. PATENT DOCUMENTS

| 6,671,153 | B1 | 12/2003 | Ker et al. |
| 6,690,561 | B2* | 2/2004 | Hung ..................... H02H 9/046 361/111 |
| 6,828,842 | B2 | 12/2004 | Saito et al. |
| 7,593,201 | B2 | 9/2009 | Ishizuka et al. |
| 7,839,612 | B1 | 11/2010 | Chan |
| 8,514,532 | B2* | 8/2013 | Worley ................... H02H 9/046 361/111 |
| 8,711,533 | B2 | 4/2014 | Tatsumi |
| 8,810,982 | B2 | 8/2014 | Fukasaku |
| 9,148,015 | B2* | 9/2015 | Kato ....................... H02H 9/046 |
| 2003/0007301 | A1 | 1/2003 | Ker et al. |
| 2004/0070901 | A1 | 4/2004 | Umeda |
| 2005/0040466 | A1* | 2/2005 | Arai ..................... H01L 27/0266 257/362 |

(Continued)

FOREIGN PATENT DOCUMENTS

| JP | 2004-014929 | 1/2004 |
| JP | 2004-087765 | 3/2004 |

(Continued)

*Primary Examiner* — Dharti H Patel
(74) *Attorney, Agent, or Firm* — Kim & Stewart LLP (57) ABSTRACT

An ESD protection circuit has a diode that includes an anode connected to a first power-supply line and a cathode connected to a second power-supply line. A metal-oxide-semiconductor (MOS) transistor is connected in series with the diode. A trigger circuit is configured to output a trigger signal to a gate of the MOS transistor in synchronization with a surge on the first power-supply line. A first resistor and a first capacitor are connected in series between the first power-supply line and the second power-supply line. A well region, in which the source and the drain of the MOS transistor are disposed, is connected to a connection point between the first resistor and the first capacitor. A potential of the connection point varies so that a forward voltage is applied to a p-n junction between the well region and the source of the MOS transistor to correspond with the surge.

20 Claims, 8 Drawing Sheets

(56) References Cited

U.S. PATENT DOCUMENTS

| | | | |
|---|---|---|---|
| 2007/0127173 A1 | 6/2007 | Chang | |
| 2009/0168282 A1* | 7/2009 | Wu | H02H 9/046 |
| | | | 361/56 |
| 2012/0307410 A1 | 12/2012 | Yamazaki et al. | |
| 2013/0027821 A1* | 1/2013 | Chen | H02H 9/046 |
| | | | 361/56 |
| 2013/0215539 A1* | 8/2013 | Chu | H02H 9/046 |
| | | | 361/56 |
| 2014/0286085 A1* | 9/2014 | Miyakawa | G11C 11/1695 |
| | | | 365/158 |
| 2015/0062764 A1* | 3/2015 | Wakita | H02H 9/043 |
| | | | 361/57 |
| 2016/0261105 A1* | 9/2016 | Kato | H02H 3/20 |

FOREIGN PATENT DOCUMENTS

| | | |
|---|---|---|
| JP | 2006-121007 | 5/2006 |
| JP | 2012-253241 | 12/2012 |
| JP | 2012-253266 | 12/2012 |
| JP | 2013-055102 | 3/2013 |
| JP | 2014-086580 | 5/2014 |
| JP | 2014-120547 | 6/2014 |
| JP | 2015-046507 | 3/2015 |

* cited by examiner

ESD PROTECTION CIRCUIT

CROSS-REFERENCE TO RELATED APPLICATION

This application is based upon and claims the benefit of priority from Japanese Patent Application No. 2016-207842, filed Oct. 24, 2016, the entire contents of which is incorporated herein by reference.

FIELD

Embodiments described herein relate generally to an electrostatic discharge (ESD) protection circuit, which protects a circuit in a semiconductor integrated circuit against surges caused by ESD.

BACKGROUND

An ESD protection circuit is used to protect an internal circuit of a semiconductor device against surges generated when an ESD occurs at, for example, a power-supply terminal. In the ESD protection circuit, when a voltage surge is detected as an increase in voltage on a power-supply line, a shunt metal-oxide semiconductor (MOS) transistor connected between the power-supply line and a grounding line is brought into a conduction state, so that electric charge associated with the surge is directed to the grounding line. An RC trigger circuit can be used to detect an increase in voltage caused by a surge and to bring the shunt MOS transistor into a conduction state. The RC trigger circuit generates a trigger signal at a junction between a series connected resistor and a capacitor.

While it is generally preferred that a shunt transistor which is to be in an ESD protection circuit have a large driving force, the larger the driving force, the larger the leakage current becomes and, thus, the higher the power consumption of a semiconductor device becomes. On the other hand, when the power consumption of a semiconductor device is lowered by limiting leakage current, the driving power for the shunt transistor drops and the discharge performance of the ESD protection circuit is lowered, so that the shunt transistor may be damaged during operation. It is desirable to reduce power consumption while maintaining the discharge performance of the ESD protection circuit.

DETAILED DESCRIPTION

In general, according to one embodiment, an ESD protection circuit comprises a diode that has an anode connected to a first power-supply line and a cathode connected to a second power-supply line. A metal-oxide-semiconductor (MOS) transistor has a source and a drain connected in series with the diode between the first power-supply line and the second power-supply line. A trigger circuit is configured to output a trigger signal to a gate of the MOS transistor for bringing the MOS transistor into a conducting state (ON-state) in synchronization with a surge on the first power-supply line. A first resistor and a first capacitor are connected in series between the first power-supply line and the second power-supply line. A well region, in which the source and the drain of the MOS transistor are disposed, is connected to a connection point between the first resistor and the first capacitor. A potential of the connection point varies so that a forward voltage is applied to a p-n junction between the well region and the source of the MOS transistor to correspond with the surge.

Hereinafter, example embodiments of the disclosure will be described with reference to the drawings. The figures are schematic views for ease of explanation. For example, the shape, dimension, and magnitude relationship of each element depicted in the figures is not necessarily the same as in the actual implementation, but may be changed as appropriate within a range in which advantages of the disclosure are obtainable. Elements having similar properties, functions, or characteristics are assigned the respective same reference numerals or the respective same reference signs and repeated description may be omitted.

First Embodiment

Figure 1:
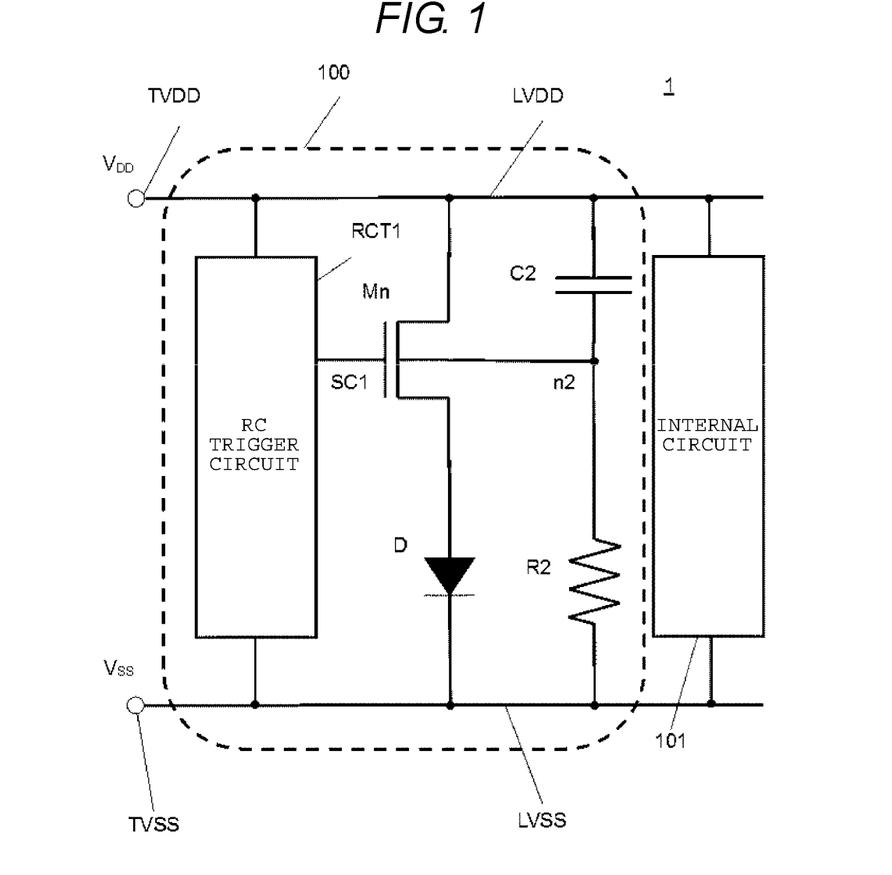
FIG. 1 is a diagram illustrating a configuration of an ESD protection circuit according to a first embodiment.
Figure 2:
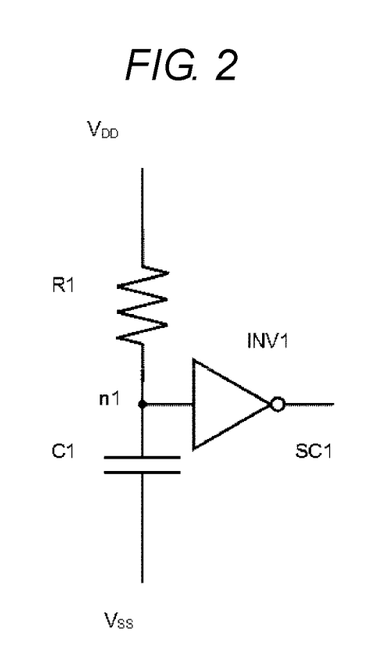
FIG. 2 is a diagram illustrating an example of a configuration of an RC trigger circuit according to the first embodiment.

FIG. 1 is a diagram illustrating a configuration of an ESD protection circuit according to a first embodiment. FIG. 2 illustrates an example of a configuration of an RC trigger circuit.

As illustrated in FIG. 1, a semiconductor integrated circuit 1 includes a first power-supply terminal TVDD connected to a first power supply (not illustrated), which supplies a first potential $V_{DD}$, and a second power-supply terminal TVSS connected to a second power supply (not illustrated), which supplies a second potential $V_{SS}$ lower than the first potential $V_{DD}$. Here, the first embodiment is described on the assumption that the second power supply is ground and the second potential $V_{SS}$ is a ground potential. Moreover, the first embodiment is described on the assumption that the first power supply is a power supply and the first potential $V_{DD}$ is a power-supply potential.

The semiconductor integrated circuit 1 includes a first power-supply line LVDD, a second power-supply line LVSS, an ESD protection circuit 100, and an internal circuit 101. The internal circuit 101 is a core device portion which includes, for example, a central processing unit (CPU) and a memory.

The first power-supply line LVDD, which electrically connects the first power-supply terminal TVDD to one end of the internal circuit 101, is used to supply the first potential $V_{DD}$ to the one end of the internal circuit 101. The second power-supply line LVSS, which electrically connects the second power-supply terminal TVSS to the other end of the internal circuit 101, is used to supply the ground potential to the other end of the internal circuit 101.

The ESD protection circuit 100 is connected between the first power-supply line LVDD and the second power-supply line LVSS. In a case where a surge caused by ESD enters the semiconductor integrated circuit 1 via the first power-supply terminal TVDD, the ESD protection circuit 100 operates and causes electric charge generated by the surge to flow out to the second power-supply line LVSS, thereby preventing an undesirably large amount of electric charge generated by the surge from intruding into the internal circuit 101 and breaking the internal circuit 101.

The ESD protection circuit 100 includes an RC trigger circuit RCT1, a shunt nMOS transistor (n-channel MOS transistor) Mn, a diode D, a capacitor C2, and a resistor R2. The diode D has an anode connected to the first power-supply line LVDD (via the shunt nMOS transistor Mn) and a cathode connected to the second power-supply line LVSS. A source and a drain of the shunt nMOS transistor Mn are connected in series with the diode D between the first power-supply line LVDD and the second power-supply line LVSS. In other words, the source of the shunt nMOS transistor Mn is connected to the anode of the diode D, and the drain of the shunt nMOS transistor Mn is connected to the first power-supply line LVDD. The cathode of the diode D is connected to the second power-supply line LVSS.

The diode D as used herein is, for example, a p-n junction diode, which is formed by joining an n-type semiconductor and a p-type semiconductor. While, in the description of the present embodiment, the p-n junction has a single-stage structure, a p-n junction with a multi-stage structure can be employed. The diode D is not limited to a p-n junction diode, and can be a parasitic diode of a MOS transistor or a diode-connected bipolar transistor.

In the parasitic diode of a MOS transistor, for example, in the case of an nMOS transistor, the gate, drain, and back gate are interconnected and function as an anode and the source of the nMOS transistor functions as a cathode. In the case of a pMOS transistor (p-channel transistor), the gate, drain, and back gate are interconnected and function as a cathode and the source functions as an anode.

For a diode-connected bipolar transistor, in the case of an npn transistor, the base functions as an anode and the emitter and collector are interconnected and function as a cathode. In the case of a pnp transistor, the base functions as a cathode and the emitter and collector are interconnected and function as an anode.

The source and drain of the shunt nMOS transistor Mn are n-type semiconductors and are formed in a well region that is a p-type semiconductor. The gate electrode is provided on the source, the well region, and the drain via a gate insulating film. The back gate electrode (not specifically illustrated) is provided so as to be electrically connected to the well region, and the potential of the well region can be adjusted via the back gate electrode.

The capacitor C2 is connected between the first power-supply line LVDD and the second power-supply line LVSS in series with the resistor R2. Thus, the resistor R2 is connected between the first power-supply line LVDD and the second power-supply line LVSS so as to be connected in series with the capacitor C2. Here, one end of the capacitor C2 is connected to the first power-supply line LVDD, and the other end of the capacitor C2 is connected to one end of the resistor R2 at a connection point (node) n2. The other end of the resistor R2 is connected to the second power-supply line LVSS. The connection point n2 is connected to the well region of the shunt nMOS transistor Mn via the back gate electrode. The potential of the connection point n2 is supplied to the well region.

As illustrated in FIG. 2, the RC trigger circuit RCT1 includes a first resistor R1, a first capacitor C1, and a first inverter circuit INV1. The first resistor R1 has one end connected to the first power-supply line LVDD and the other end connected to one end of the first capacitor C1 at a connection point (node) n1. The other end of the first capacitor C1 is connected to the second power-supply line LVSS. The first resistor R1 and the first capacitor C1 are connected in series between the first power-supply line LVDD and the second power-supply line LVSS.

The connection point n1 is connected to the input terminal of the first inverter circuit INV1. The output terminal of the first inverter circuit INV1 is connected to the gate of the shunt nMOS transistor Mn. When a surge is applied to the first power-supply terminal TVDD, the potential $V_{DD}$ of the first power-supply line LVDD rises and, in synchronization with this rise, a trigger signal SC1 for bringing the shunt nMOS transistor Mn into a conduction state is output from the first inverter circuit INV1 of the RC trigger circuit RCT1, details of which are described below.

Figure 3:
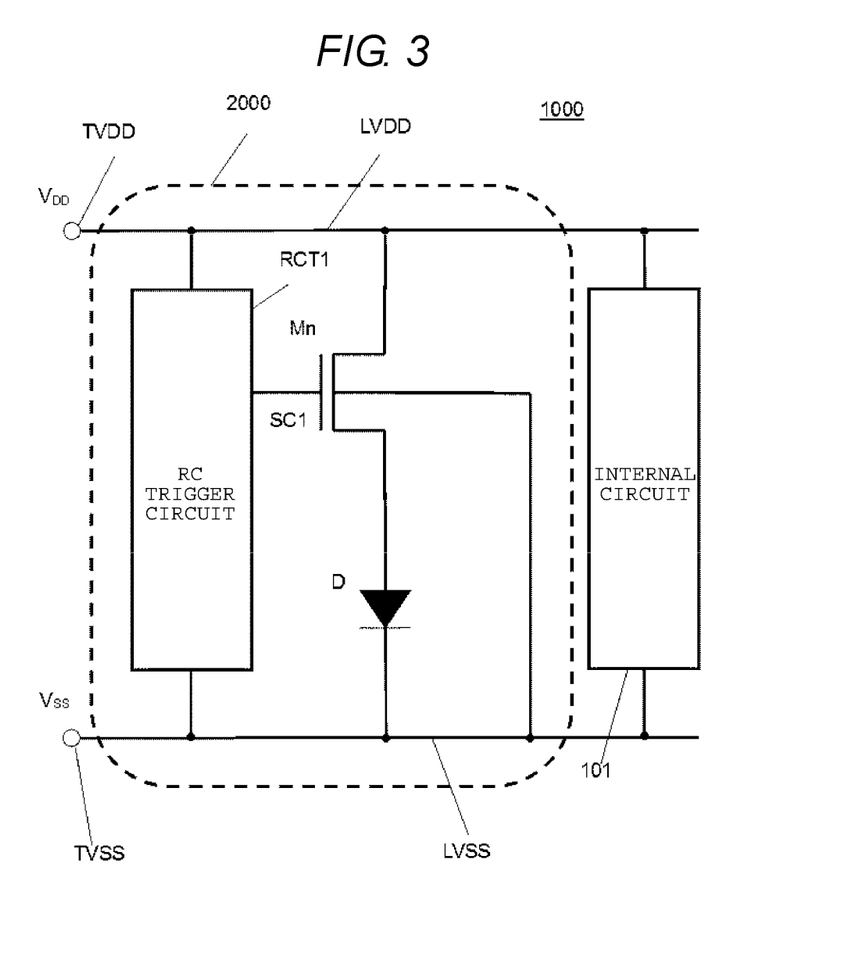
FIG. 3 is a diagram illustrating a configuration of an ESD protection circuit according to a comparative example.

Next, an operation of the ESD protection circuit 100 according to the present embodiment is described while being compared with a comparative example. FIG. 3 illustrates an ESD protection circuit 2000 according to the comparative example. In the comparative example, the ESD protection circuit 2000 is connected between the first power-supply line LVDD and the second power-supply line LVSS in a semiconductor integrated circuit 1000. The internal circuit 101 is connected between the first power-supply line LVDD and the second power-supply line LVSS. When a surge caused by ESD enters the semiconductor integrated circuit 1000 via the first power-supply terminal TVDD, the ESD protection circuit 2000 operates, so that electric charge generated by the surge is caused to flow out from the first power-supply line LVDD to the second power-supply line LVSS via the ESD protection circuit 2000. This prevents electric charge generated by the surge from entering the internal circuit 101.

The ESD protection circuit 2000 includes an RC trigger circuit RCT1, a shunt nMOS transistor Mn, and a diode D in a manner similar to the ESD protection circuit 100. The ESD protection circuit 2000 and the ESD protection circuit 100 differ in that the back gate of the shunt nMOS transistor Mn of the ESD protection circuit 2000 is directly connected to the second power-supply line LVSS without intervening element or other connection. In other words, the potential of the well region of the shunt nMOS transistor Mn of the ESD protection circuit 2000 is fixed to the ground potential.

Figure 4:
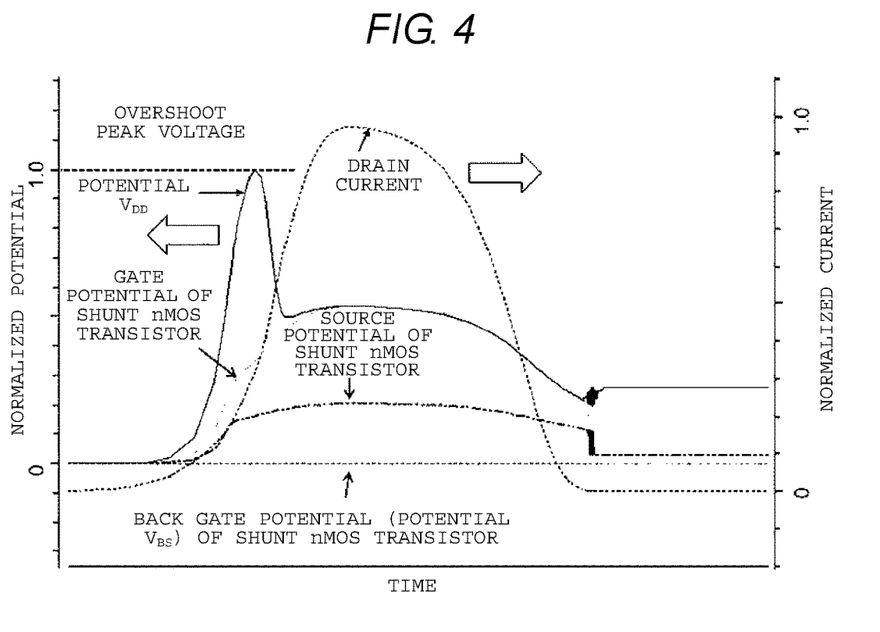
FIG. 4 is a diagram illustrating an operation of the ESD protection circuit according to the comparative example.

Referring to FIG. 4, an operation of the ESD protection circuit 2000 is depicted. FIG. 4 illustrates changes over time of the gate potential of the shunt nMOS transistor Mn, the drain current of the shunt nMOS transistor Mn, the drain potential of the shunt nMOS transistor Mn (in FIG. 4, illustrated by the power-supply potential $V_{DD}$ applied to the first power-supply line LVDD), the source potential of the shunt nMOS transistor Mn, and the back gate potential of the shunt nMOS transistor Mn when a surge caused by ESD intrudes into the semiconductor integrated circuit 1000 via the first power-supply terminal TVDD. The vertical axis at the left-hand side indicates a potential normalized based on the maximum value of the drain potential of the ESD protection circuit 2000. The vertical axis at the right-hand side indicates a current normalized based on the maximum value of the drain current of the ESD protection circuit 2000. The horizontal axis indicates time.

When a surge caused by ESD is applied to the first power-supply line LVDD in the semiconductor integrated circuit 1000, the potential (drain potential) $V_{DD}$ of the first power-supply line LVDD is increased by the amount of electric charge generated by the surge. In the RC trigger circuit RCT1, within the time of the time constant R1×C1 (the product of resistance of the first resistor R1 and the capacitance of the first capacitor C1), the potential of the connection point n1 between the first resistor R1 and the first capacitor C1 becomes lower than the potential of the first power-supply line LVDD.

Since the same power-supply potential $V_{DD}$ as that of the first power-supply line LVDD is supplied as a power supply to the first inverter circuit INV1, within the time corresponding to the time constant of the RC trigger circuit RCT1, the potential of the input side of the first inverter circuit INV1 becomes lower than the source potential of a p-channel MOS transistor included in the first inverter circuit INV1. As a result, the p-channel MOS transistor is turned on (enters a conduction state), so that the first inverter circuit INV1 generates a high-level output, and this output serves as a trigger signal SC1 to be output from the RC trigger circuit RCT1.

Before a surge is applied, the potential of the connection point n1 is the same as the potential of the first power-supply line LVDD. In this case, the p-channel MOS transistor of the first inverter circuit INV1 is turned off (enters a non-conduction state), so that the first inverter circuit INV1 generates a low-level output as the trigger signal SC1.

The trigger signal SC1 is supplied to the gate of the shunt nMOS transistor Mn. As illustrated in FIG. 4, since the trigger signal SC1 is at high level only within the time corresponding to the time constant of the RC trigger circuit RCT1 after a surge is applied to the first power-supply line LVDD, the gate potential of the shunt nMOS transistor Mn rises, so that the shunt nMOS transistor Mn remains in an on-state.

When the shunt nMOS transistor Mn enters an on-state, a drain current flows between the drain and source of the shunt nMOS transistor Mn, so that electric charge generated by a surge occurring in the first power-supply line LVDD is released to the ground via the second power-supply line LVSS.

The anode of the diode D is connected between the source of the shunt nMOS transistor Mn and the second power-supply line LVSS. In a steady state in which no surge is applied to the first power-supply line LVDD, since the trigger signal SC1 is at low level, the shunt nMOS transistor Mn enters an off-state. At this time, the gate of the shunt nMOS transistor Mn is at the ground potential. Moreover, the back gate of the shunt nMOS transistor Mn is grounded and is, therefore, always kept at the ground potential. Thus, the potential of the well region always remains at the ground potential.

Even when in an off-state, the shunt nMOS transistor Mn allows a leakage current between the drain and source. Here, when the diode D is connected to the source of the shunt nMOS transistor Mn, the source potential becomes higher than the ground potential by a forward bias voltage of the diode D. As a result, the voltage between gate and source becomes a more negative voltage as compared with a case where the diode D is not provided, so that a leakage current of the shunt nMOS transistor Mn is thus restrained.

However, in the ESD protection circuit 2000 according to the comparative example, when electric charge generated by a surge is released by causing a drain current to flow, the voltage between gate and source also decreases by a forward bias voltage of the diode D. Therefore, the driving force of the shunt nMOS transistor Mn in an on-state decreases. As a result, even if the shunt nMOS transistor Mn enters an on-state immediately after the surge is applied as illustrated in FIG. 4, a large amount of electric charge occurring in the first power-supply line LVDD is unlikely to be instantly released, so that the power-supply potential $V_{DD}$ of the first power-supply line LVDD rapidly rises, thus causing overshoot. As a result, the potential $V_{DD}$ of the first power-supply line LVDD would exhibit large overshoot when a drain current finally begins to flow.

As mentioned above, in the ESD protection circuit 2000, the diode D being connected to the shunt nMOS transistor Mn enables restraining a leakage current. On the other hand, the driving force of the shunt nMOS transistor Mn is decreased by the diode D when the ESD protection circuit 2000 operates. Then, the overshoot of the potential of the first power-supply line LVDD when a surge is applied can be extremely large. This may cause the shunt nMOS transistor Mn to be broken/damaged. In other words, the discharge performance of the ESD protection circuit 2000 decreases because the shunt nMOS transistor Mn may be broken.

In contrast, in the ESD protection circuit 100 according to the present embodiment, the back gate electrode $V_3$ of the shunt nMOS transistor Mn is connected to the connection point n2 between the capacitor C2 and the resistor R2. Therefore, the potential of the well region of the shunt nMOS transistor Mn is not fixed to the ground potential but varies according to the potential of the connection point n2 between the capacitor C2 and the resistor R2.

When a surge is applied to the first power-supply line LVDD, the potential $V_{DD}$ of the first power-supply line LVDD rapidly rises. At this time, since a current flows across the resistor R2 for a period corresponding to the time constant R2×C2 (defined by the capacitance of capacitor C2 and the resistance of resistor R2) so that the capacitor C2 is charged, the potential of the connection point n2 shifts from the ground potential to a positive potential (higher than the ground potential). Accordingly, a positive potential is applied to the well region of the shunt nMOS transistor Mn. In other words, since the well region of the shunt nMOS transistor Mn is a p-type semiconductor and the source thereof is an n-type semiconductor, a forward voltage is applied to the p-n junction between the well region and the source of the shunt nMOS transistor Mn.

Figure 6:
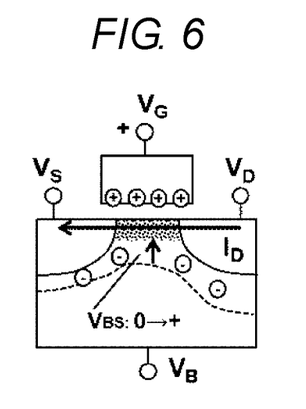
FIG. 6 is a diagram illustrating aspects of a substrate bias effect.

FIG. 6 is a simplified cross-sectional view illustrating an operation of the shunt nMOS transistor Mn. Here, $V_G$ denotes a gate potential, $V_D$ denotes a drain potential, $V_S$ denotes a source potential, and $V_3$ denotes a back gate potential. As mentioned above, the back gate potential $V_3$ of the ESD protection circuit 100 rises from the ground potential to a positive potential immediately after a surge is applied.

Figure 7:
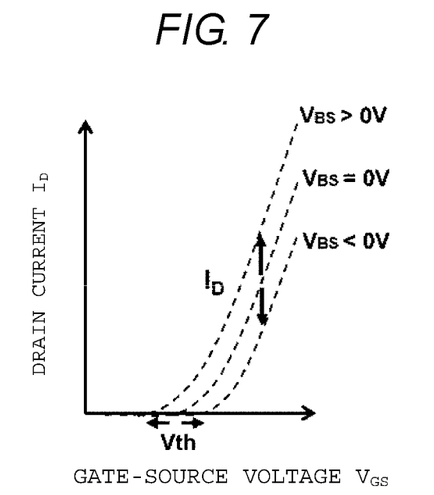
FIG. 7 is a diagram illustrating additional aspects of a substrate bias effect.

A back gate effect of an nMOS transistor is described with reference to FIG. 7. FIG. 7 illustrates a dependency on a voltage between back gate and source ($V_{BS}$) in a relationship between the drain current and the gate potential (a voltage between gate and source ($V_{GS}$)) of the nMOS transistor. When the voltage $V_{BS}$ of the nMOS transistor becomes a positive voltage, the threshold voltage $V_{th}$ decreases as compared with a case where the voltage $V_{BS}$ is zero (i.e., the back gate is grounded), and the drain current of the nMOS transistor increases and a driving force thereof increases. In other words, when a forward voltage is applied to a p-n junction between the well region and the source, the drain current of the nMOS transistor increases and a driving force of the nMOS transistor increases. On the other hand, when the voltage $V_{BS}$ of the nMOS transistor becomes a negative voltage, the threshold voltage $V_{th}$ increases as compared with a case where the voltage $V_{BS}$ is zero (the back gate is grounded), and the drain current of the nMOS transistor decreases and a driving force thereof decreases. In other words, when a backward bias voltage is applied to a p-n junction between the well region and the source, the drain current of the nMOS transistor decreases and a driving force of the nMOS transistor decreases.

Figure 5:
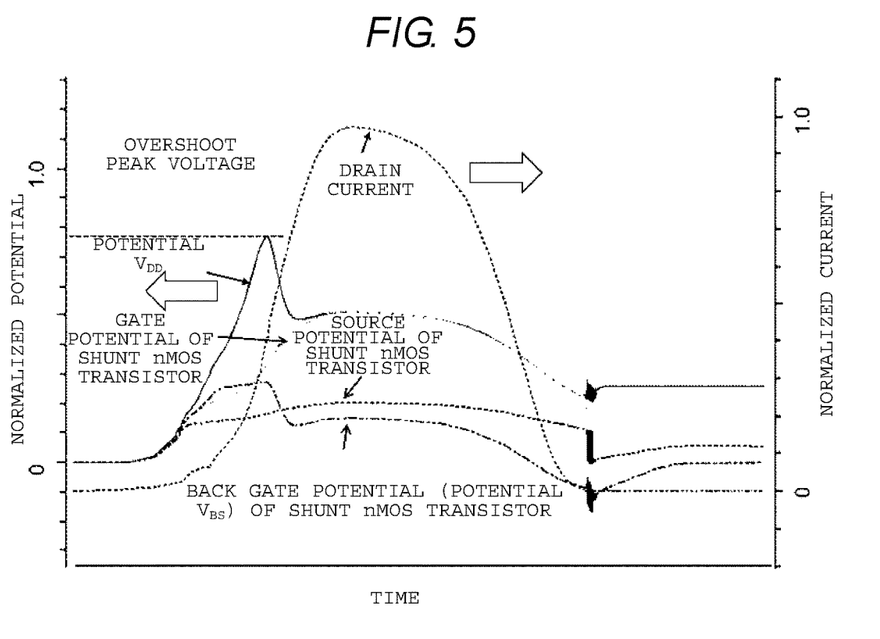
FIG. 5 is a diagram illustrating an operation of the ESD protection circuit according to the first embodiment.

As illustrated in FIG. 5, for the ESD protection circuit 100, when a surge is applied, the driving force of the shunt nMOS transistor Mn increases since the potential between back gate and source ($V_{BS}$) of the shunt nMOS transistor Mn becomes a positive potential. With this, the release of surge electric charge by the shunt nMOS transistor Mn immediately after the application of a surge can be more efficiently performed as compared with that in the ESD protection circuit 2000 according to the comparative example. As a result, in the ESD protection circuit 100, the overshoot of the potential $V_{DD}$ of the first power-supply line LVDD can be more restrained than in the ESD protection circuit 2000. As the discharge performance of the ESD protection circuit 100 is improved, the shunt nMOS transistor Mn can be prevented from being broken.

Furthermore, the trigger signal SC1 becomes at high level immediately after a surge is applied for a time corresponding to the time constant R1×C1 of a series circuit of the first resistor R1 and the first capacitor C1 included in the RC trigger circuit RCT1 of the ESD protection circuit 100, and the gate potential of the shunt nMOS transistor Mn becomes a positive potential, so that the shunt nMOS transistor Mn remains in an on-state. Also, immediately after a surge is applied, for the time corresponding to the time constant R2×C2 of a series circuit of the resistor R2 and the capacitor C2, the connection point n2 between the resistor R2 and the capacitor C2 remains at a positive potential, so that the voltage between back gate and source $V_{BS}$ remains as a positive voltage. In other words, a forward voltage is applied between the back gate and the source.

Second Embodiment

Figure 8:
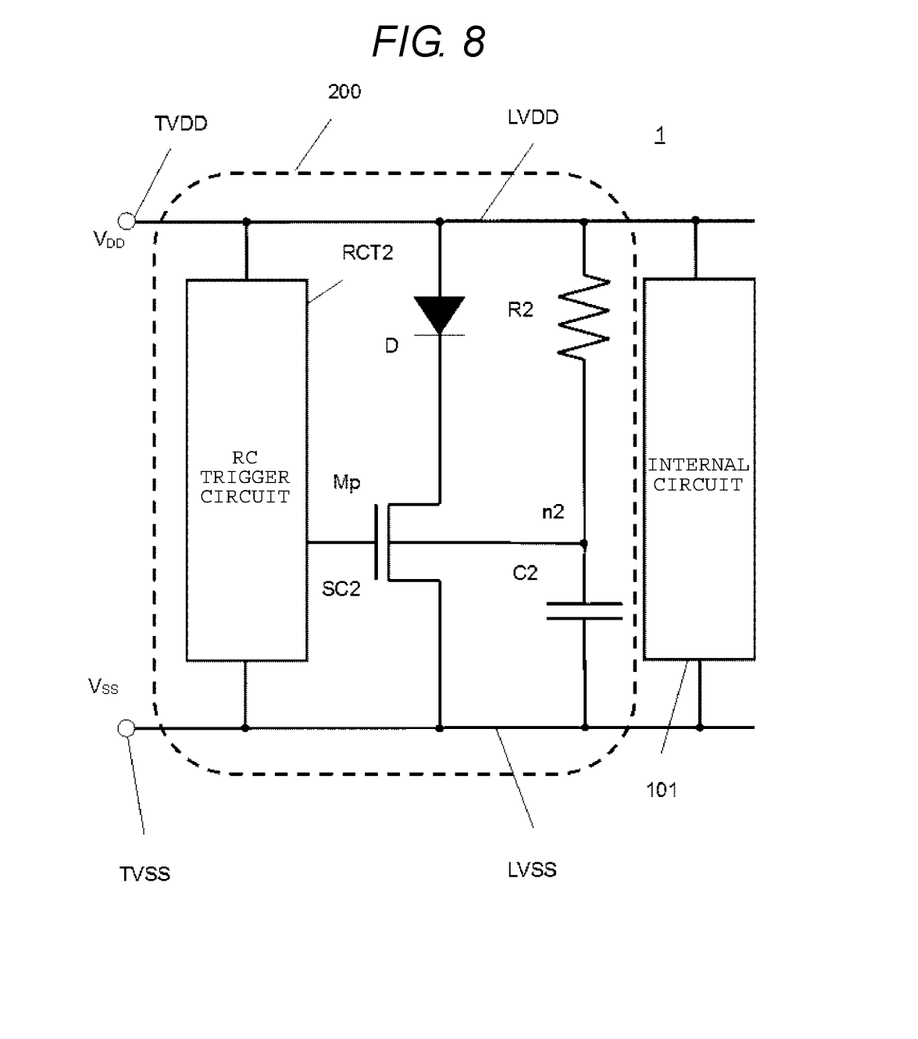
FIG. 8 is a diagram illustrating a configuration of an ESD protection circuit according to a second embodiment.

Next, an ESD protection circuit 200 according to a second embodiment is described with reference to FIG. 8. The ESD protection circuit 200 according to the second embodiment differs from the ESD protection circuit 100 according to the first embodiment in the following points.

The ESD protection circuit 200 includes a p-channel shunt pMOS transistor Mp instead of the n-channel shunt nMOS transistor Mn. As in the first embodiment, the diode D includes an anode connected to the first power-supply line LVDD and a cathode connected to the second power-supply line LVSS, and a source and a drain of the shunt pMOS transistor Mp are connected in series with the diode D between the first power-supply line LVDD and the second power-supply line LVSS. The ESD protection circuit 200 differs from the ESD protection circuit 100 in that the source of the shunt pMOS transistor Mp is connected to the cathode of the diode D and the drain of the shunt pMOS transistor Mp is connected to the second power-supply line LVSS. Moreover, the well region of the shunt pMOS transistor Mp is an n-type semiconductor, and the source and drain thereof are p-type semiconductors.

Furthermore, the ESD protection circuit 200 and the ESD protection circuit 100 are similar in that the capacitor C2 is connected in series between the first power-supply line LVDD and the second power-supply line LVSS with the resistor R2. However, the ESD protection circuit 200 differs from the ESD protection circuit 100 in that one end of the resistor R2 is connected to the first power-supply line LVDD, and the other end of the resistor R2 is connected to one end of the capacitor C2 at a connection point n2. The other end of the capacitor C2 is connected to the second power-supply line LVSS. The connection point n2 is connected to the well region of the shunt pMOS transistor Mp via the back gate electrode. The potential of the connection point n2 is supplied to the well region.

Figure 9:
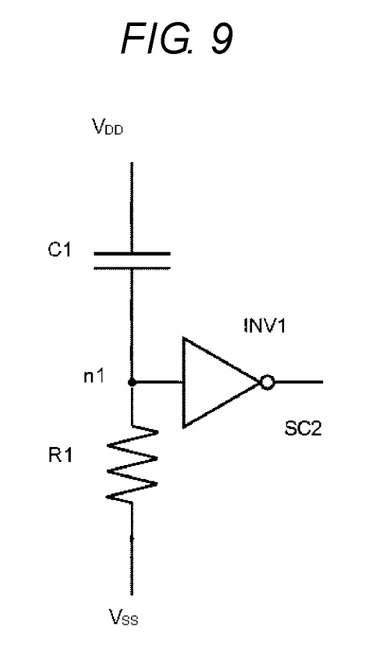
FIG. 9 is a diagram illustrating an example of a configuration of an RC trigger circuit according to the second embodiment.

FIG. 9 illustrates a specific example of an RC trigger circuit RCT2 that can be included in the ESD protection circuit 200. As illustrated in FIG. 9, the RC trigger circuit RCT2 includes a first resistor R1, a first capacitor C1, and a first inverter circuit INV1, as was the case with the ESD protection circuit 100. However, the ESD protection circuit 200 differs from the ESD protection circuit 100 in that first capacitor C1 has one end connected to the first power-supply line LVDD and the other end connected to one end of the first resistor R1 at a connection point n1. The other end of the first resistor R1 is connected to the second power-supply line LVSS. The first resistor R1 and the first capacitor C1 are connected in series between the first power-supply line LVDD and the second power-supply line LVSS.

The other end of the first capacitor C1 is connected to the input terminal of the first inverter circuit INV1. The output terminal of the first inverter circuit INV1 is connected to the gate of the shunt pMOS transistor Mp. When a surge is applied to the first power-supply terminal TVDD, the potential $V_{DD}$ of the first power-supply line LVDD rises. In synchronization with this rise, a trigger signal SC2 for bringing the shunt pMOS transistor Mp into a conduction state is output from the first inverter circuit INV1 of the RC trigger circuit RCT2, details of which are described below.

Next, an operation of the ESD protection circuit 200 is described. When a surge caused by the ESD is applied to the first power-supply line LVDD included in the semiconductor integrated circuit 1, the potential (drain potential) $V_{DD}$ of the first power-supply line LVDD is increased by a large amount. In the RC trigger circuit RCT2, within the time corresponding to the time constant R1×C1 (the product of resistance of the first resistor R1 and the capacitance of the first capacitor C1), the potential of the connection point n1 between the first resistor R1 and the first capacitor C1 shifts from the potential of the second power-supply line LVSS (the ground potential $V_{SS}$), to a potential higher than the ground potential $V_{SS}$. As a result, the trigger signal SC2 output from the first inverter circuit INV1 becomes at low level. Thus, a low-level signal is input to the gate of the shunt pMOS transistor Mp, so that the shunt pMOS transistor Mp enters an on-state. Furthermore, before a surge is applied to the first power-supply line LVDD, the first inverter circuit INV1 receives the ground potential and thus outputs a high-level signal. Since the gate voltage is higher than the threshold value, the shunt pMOS transistor Mp is in an off-state.

When the shunt pMOS transistor Mp enters an on-state, a drain current flows between the drain and source of the shunt pMOS transistor Mp. Thus, electric charge caused by the surge on the first power-supply line LVDD is released to the ground via the second power-supply line LVSS. During the time corresponding to the time constant R1×C1, since the shunt pMOS transistor Mp is in an on-state, electric charge generated by the surge is released to the ground.

Immediately after a surge is applied, since a current for charging the capacitor C2 flows across the resistor R2, the potential of the connection point n2 between the resistor R2 and the capacitor C2 becomes lower than the potential $V_{DD}$ of the first power-supply line LVDD. Therefore, the well region of the shunt pMOS transistor Mp enters a state of being negatively biased to the source potential. In other words, a state in which a forward voltage is applied to a p-n junction between the well region and the source occurs.

The back gate effect of a pMOS transistor has a property opposite to that of an nMOS transistor with regard to the voltage between back gate and source $V_{BS}$. More specifically, when the voltage between back gate and source $V_{BS}$ becomes negative, a forward voltage is applied to a p-n junction between the well region and the source, so that the driving force of the shunt pMOS transistor increases. Therefore, even in the ESD protection circuit 200, as in the ESD protection circuit 100 according to the first embodiment, the overshoot of the potential $V_{DD}$ of the first power-supply line LVDD immediately after the application of a surge can be restrained. As a result, since the discharge performance of the ESD protection circuit 200 is improved, the shunt pMOS transistor in the ESD protection circuit 200 can be prevented from being broken/damaged.

As in the first embodiment, during the time corresponding to the time constant R2×C2 of a series circuit configured with the resistor R2 and the capacitor C2 immediately after a surge is applied, the connection point n2 between the resistor R2 and the capacitor C2 remains at a potential lower than the potential of the first power-supply line LVDD in the second embodiment. With this, the voltage between back gate and source $V_{BS}$ remains as a negative voltage. In other words, since the well region of the shunt pMOS transistor Mp is an n-type semiconductor and the source thereof is a p-type semiconductor, a forward voltage is applied to a p-n junction between the well region and the source of the shunt pMOS transistor Mp. During this time, the driving force of the shunt pMOS transistor Mp increases, and the discharge performance of the ESD protection circuit 200 is improved.

Third Embodiment

Figure 10:
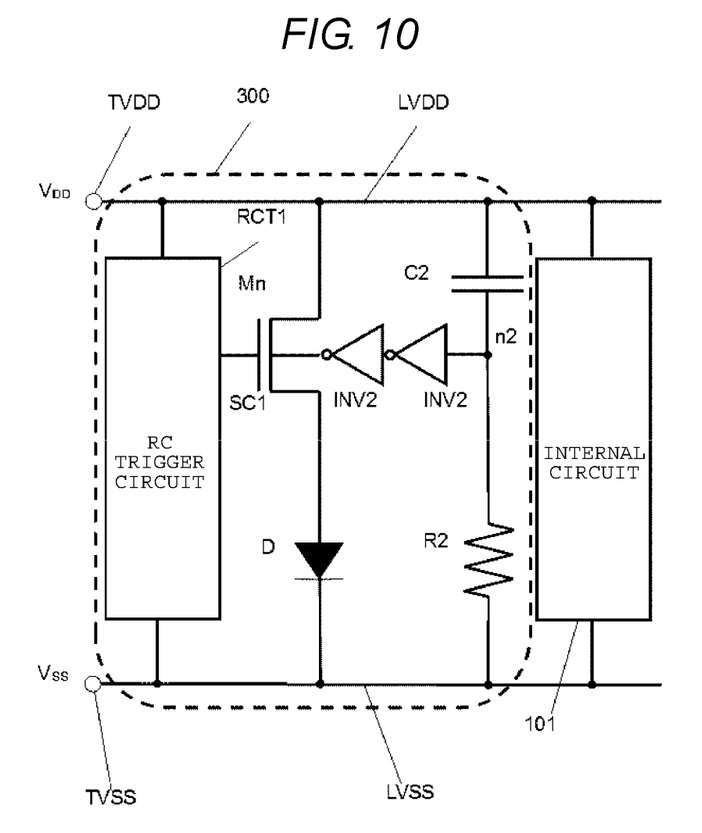
FIG. 10 is a diagram illustrating a configuration of an ESD protection circuit according to a third embodiment.

Next, an ESD protection circuit 300 according to a third embodiment is described with reference to FIG. 10. FIG. 10 illustrates a configuration of the ESD protection circuit 300 according to the third embodiment. As with the ESD protection circuit 100 according to the first embodiment, the ESD protection circuit 300 according to the third embodiment includes a shunt nMOS transistor Mn, a diode D, a capacitor C2, a resistor R2, and an RC trigger circuit RCT1. The ESD protection circuit 300 differs from the ESD protection circuit 100 in that two second inverter circuits INV2 connected in series as two stages are connected between the back gate of the shunt nMOS transistor Mn and a connection point n2.

As in the ESD protection circuit 100, the potential of the connection point n2 between the capacitor C2 and the resistor R2 is supplied to the well region of the shunt nMOS transistor Mn. Thereby, during the time corresponding to the time constant R2×C2 of a series circuit configured with the resistor R2 and the capacitor C2 immediately after a surge is applied, the voltage between back gate and source $V_{BS}$ of the shunt nMOS transistor Mn remains as a positive voltage. With this, a forward voltage is applied to a p-n junction between the well region and the source and the driving force of the shunt nMOS transistor Mn increases. Then, the overshoot of the potential $V_{DD}$ of the first power-supply line LVDD is restrained and the shunt nMOS transistor Mn is prevented from being broken.

Furthermore, in the ESD protection circuit 300, since there are two second inverter circuits INV2 connected in series between the back gate potential of the shunt nMOS transistor Mn and the connection point n2 between the capacitor C2 and the resistor R2, there is a further effect of being able to more stably keep the voltage between back gate and source $V_{BS}$ at a positive voltage when a surge is applied. In this description of the third embodiment, the second inverter circuits are provided in two stages, but the embodiment is not limited to two stages and may be any even number of 2 or more.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An ESD protection circuit, comprising:
   a diode having an anode connected to a first power-supply line and a cathode connected to a second power-supply line;
   a metal-oxide-semiconductor (MOS) transistor that includes a source and a drain connected in series with the diode between the first power-supply line and the second power-supply line;
   a trigger circuit configured to output a trigger signal to a gate of the MOS transistor for bringing the MOS transistor into a conducting state in synchronization with a surge on the first power-supply line;
   a first resistor and a first capacitor connected in series between the first power-supply line and the second power-supply line, wherein:
   a well region in which the source and the drain of the MOS transistor are disposed is connected to a connection point between the first resistor and the first capacitor, and
   a potential of the connection point varies so that a forward voltage is applied to a p-n junction between the well region and the source of the MOS transistor to correspond with the surge.

2. The ESD protection circuit according to claim 1, wherein the diode comprises a p-n junction diode.

3. The ESD protection circuit according to claim 1, wherein the diode comprises a parasitic diode formed by a second MOS transistor.

4. The ESD protection circuit according to claim 1, wherein the diode comprises a diode-connected bipolar transistor.

5. The ESD protection circuit according to claim 1, further comprising an even number of second inverter circuits connected in series between the well region and the connection point.

6. The ESD protection circuit according to claim 1, wherein
   the trigger circuit comprises:
   a second resistor having a first end connected to the first power-supply line;

a second capacitor having a first end connected to a second end of the second resistor and a second end connected to the second power-supply line; and a first inverter circuit having an input terminal connected to the second end of the second resistor and an output terminal connected to the gate of the MOS transistor, the MOS transistor comprises an n-channel MOS transistor, the source of the MOS transistor is connected to the anode of the diode, a first end of the first capacitor is connected to the first power-supply line, a second end of the first capacitor is connected to the connection point, a first end of the first resistor is connected to the connection point, and a second end of the first resistor is connected to the second power-supply line.

7. The ESD protection circuit according to claim 6, wherein the diode comprises a p-n junction diode.

8. The ESD protection circuit according to claim 6, wherein the diode comprises a parasitic diode formed by a second MOS transistor.

9. The ESD protection circuit according to claim 6, wherein the diode comprises a diode-connected bipolar transistor.

10. The ESD protection circuit according to claim 6, further comprising an even number of second inverter circuits connected in series between the well region and the connection point.

11. The ESD protection circuit according to claim 6, wherein the first power-supply line and the second power-supply line are connected to an internal circuit.

12. The ESD protection circuit according to claim 1, wherein the trigger circuit comprises:
a second capacitor having a first end connected to the first power-supply line;

a second resistor having a first end connected to a second end of the second capacitor and a second end connected to the second power-supply line; and a first inverter circuit including an input terminal connected to the second end of the second capacitor and an output terminal connected to the gate of the MOS transistor, the MOS transistor comprises a p-channel MOS transistor, the source of the MOS transistor is connected to the cathode of the diode, a first end of the first resistor is connected to the first power-supply line, a second end of the first resistor is connected to the connection point, a first end of the first capacitor is connected to the connection point, and a second end of the first capacitor is connected to the second power-supply line.

13. The ESD protection circuit according to claim 12, wherein the diode comprises a p-n junction diode.

14. The ESD protection circuit according to claim 12, wherein the diode comprises a parasitic diode of a MOS transistor.

15. The ESD protection circuit according to claim 12, wherein the diode comprises a diode-connected bipolar transistor.

16. The ESD protection circuit according to claim 12, further comprising an even number of second inverter circuits connected between the well region and the connection point.

17. An ESD protection circuit, comprising:
an RC trigger circuit connected between a first power-supply line and a second power-supply line and configured to output a trigger signal corresponding to a surge on the first power-supply line;

a metal-oxide-semiconductor (MOS) transistor and a diode connected in series between the first power-supply line and the second power-supply line, a gate of the MOS transistor connected to the RC trigger circuit to receive the trigger signal from the RC trigger circuit; and a first resistor and a first capacitor connected in series between the first power-supply line and the second power-supply line, a connection node between the first resistor and the first capacitor being connected to a back gate electrode of the MOS transistor.

18. The ESD protection circuit according to claim 17, wherein the MOS transistor comprises a n-channel transistor.

19. The ESD protection circuit according to claim 17, wherein the MOS transistor comprises p-channel transistor.

20. The ESD protection circuit according to claim 17, further comprising a plurality of inverters connected in series between the connection node and the back gate electrode, wherein the number of inverters in the plurality of inverters is an even number.

* * * * *